United States Patent
Raj et al.

(10) Patent No.: US 7,899,049 B2
(45) Date of Patent: Mar. 1, 2011

(54) METHODS AND APPARATUS FOR MINIMIZING DUPLICATE TRAFFIC DURING POINT TO MULTIPOINT TREE SWITCHING IN A NETWORK

(75) Inventors: Alex E. Raj, Westford, MA (US); Robert H. Thomas, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 705 days.

(21) Appl. No.: 11/497,952

(22) Filed: Aug. 1, 2006

(65) Prior Publication Data
US 2008/0031130 A1 Feb. 7, 2008

(51) Int. Cl.
H04L 12/28 (2006.01)
H04L 12/56 (2006.01)
H04J 3/26 (2006.01)

(52) U.S. Cl. ...................... 370/390; 370/432

(58) Field of Classification Search .......... 370/408, 370/389, 256, 395.1, 396, 400, 406, 242, 370/216, 395.52, 390, 432; 709/238, 242, 709/252
See application file for complete search history.

(56) References Cited

U.S. PATENT DOCUMENTS

| | | | |
|---|---|---|---|
| 6,373,822 B1 | 4/2002 | Raj et al. | 370/252 |
| 6,408,001 B1 | 6/2002 | Chuah et al. | 370/392 |
| 6,512,768 B1 | 1/2003 | Thomas | 370/389 |
| 6,584,071 B1 | 6/2003 | Kodialam et al. | 370/238 |
| 6,628,649 B1 | 9/2003 | Raj et al. | 370/360 |
| 6,665,273 B1 | 12/2003 | Goguen et al. | 370/252 |
| 6,721,269 B2 | 4/2004 | Cao et al. | 370/227 |
| 6,735,190 B1 | 5/2004 | Chuah et al. | 370/352 |
| 6,856,991 B1 | 2/2005 | Srivastava | 707/10 |
| 6,879,594 B1* | 4/2005 | Lee et al. | 370/408 |
| 6,895,441 B1 | 5/2005 | Shabtay et al. | 709/238 |
| 6,925,081 B2 | 8/2005 | Meda | 370/392 |
| 6,950,398 B2 | 9/2005 | Guo et al. | 370/235 |
| 6,970,464 B2 | 11/2005 | Xu et al. | 370/392 |
| 7,061,921 B1 | 6/2006 | Sheth | 370/395.52 |
| 7,315,510 B1 | 1/2008 | Owens et al. | 370/218 |
| 2001/0034793 A1* | 10/2001 | Madruga et al. | 709/238 |
| 2002/0004843 A1 | 1/2002 | Andersson et al. | 709/238 |
| 2002/0112072 A1 | 8/2002 | Jain | 709/239 |
| 2002/0167895 A1 | 11/2002 | Zhu et al. | 370/216 |

(Continued)

OTHER PUBLICATIONS

Multicast Extentions for LDP, IJsbrand Wijnands et al, Mar. 2005, Cisco systems, Inc.*

(Continued)

*Primary Examiner*—Derrick W Ferris
*Assistant Examiner*—Maharishi Khirodhar
(74) *Attorney, Agent, or Firm*—Brinks Hofer Gilson & Lione

(57) ABSTRACT

A method, apparatus and computer program product for minimizing or preventing duplicate traffic during point to multipoint tree switching in a network. In its operation, embodiments disclosed herein utilize control plane trigger mechanisms to handle the receipt of duplicate traffic by network entities after the occurrence of a network failure event. Generally, the control plane trigger mechanism prevents a network entity from processing multicast traffic from both old and new upstream data paths resulting from typical network convergence procedures. The methods and apparatus describe herein apply to standard rerouting procedures as well as fast rerouting procedures for multicast traffic in a network.

24 Claims, 11 Drawing Sheets

U.S. PATENT DOCUMENTS

| | | | |
|---|---|---|---|
| 2003/0063560 A1 | 4/2003 | Jenq et al. | 370/216 |
| 2004/0071080 A1 | 4/2004 | Uchiyama et al. | 370/225 |
| 2005/0088965 A1 | 4/2005 | Atlas et al. | 370/216 |
| 2005/0111351 A1 | 5/2005 | Shen | 370/217 |
| 2005/0237927 A1 | 10/2005 | Kano et al. | 370/216 |
| 2006/0013127 A1 | 1/2006 | Izaiku et al. | 370/225 |
| 2006/0034251 A1 | 2/2006 | Sivabalan et al. | 370/351 |
| 2006/0159009 A1* | 7/2006 | Kim et al. | 370/216 |
| 2006/0221975 A1 | 10/2006 | Lo et al. | 370/395.5 |
| 2006/0239266 A1 | 10/2006 | Babbar et al. | 370/392 |
| 2007/0036072 A1 | 2/2007 | Raj et al. | 370/225 |
| 2007/0174483 A1 | 7/2007 | Raj et al. | 709/238 |
| 2007/0201355 A1 | 8/2007 | Vasseur et al. | 370/217 |

OTHER PUBLICATIONS

Shen, Naimig, Chen, Enke, Tian, Albert, Discovering LDP Next-Nexthop Labels, draft-shen-mpls-ldp-nnhop-label-02.txt, dated May 2005.

Wijnands, IJsbrand, Thomas, Bob, Kamite, Yuji, Fukuda, Hitoshi, Multicast Extensions for LDP, draft-wijnands-mpls-ldp-mcast-ext-00.txt, dated Mar. 2005.

Andersson, L., Doolan, P., Feldman, N., Fredette, A., Thomas, B., RFC 3036, The Internet Society, dated Jan. 2001.

Bryant et al., draft-bryant-ipfrr-tunnels-01.txt, dated Oct. 2004, www.ietf.org.

Shand, M., draft-ietf-rtgwg-ipfrr-framework-02.txt, dated Oct. 2004, www.ietf.org.

Alia Atlas, Ed, draft-ietf-rtgwg-ipfrr-spec-base-01.txt, dated Mar. 2005, www.ietf.org.

Pan et al., draft-ietf-mpls-rsvp-lsp-fastreroute-05.txt, dated Nov. 2004, www.ietf.org.

Pointurier, Yvan, Link Failure Recovery for MPLS Networks with Multicasting, dated Aug. 2002, pp. 1-204, University of Virginia, Virginia.

Baker, F., Savola, P., RFC 3704, dated Mar. 2004, pp. 1-15, The Internet Society, www.ietf.org.

Deal, Richard, Cisco Router Firewall Security, Part VI Chapter 15; Routing Protocol Protection: Reverse-Path Forwarding (Unicast Traffic), dated Aug. 10, 2004, pp. 629, Cisco Press.

* cited by examiner

METHODS AND APPARATUS FOR MINIMIZING DUPLICATE TRAFFIC DURING POINT TO MULTIPOINT TREE SWITCHING IN A NETWORK

BACKGROUND

The Internet is a massive network of networks in which computers communicate with each other via use of different communication protocols. The Internet includes packet-routing devices, such as switches, routers and the like, interconnecting many computers. To support routing of information such as packets, each of the packet-routing devices typically maintains routing tables to perform routing decisions in which to forward traffic from a source computer, through the network, to a destination computer.

One way of forwarding information through a provider network over the Internet is based on MPLS (Multiprotocol Label Switching) techniques. In an MPLS-network, incoming packets are imposed with a label by a so-called LER (Label Edge Router) receiving the incoming packets. The packets in the MPLS network are forwarded along a predefined Label Switch Path (LSP) defined in the MPLS network based on label on the packets. At internal nodes of the MPLS-network, the packets are forwarded along a predefined LSP through so-called Label Switch Routers. LDP (Label Distribution Protocol) is used to distribute appropriate labels for label-switching purposes.

Each Label Switching Router (LSR) in an LSP between respective LERs in an MPLS-type network makes forwarding decisions based solely on a label of a corresponding packet. Depending on the circumstances, a packet may need to travel through many LSRs along a respective path between LERs of the MPLS-network. As a packet travels through a label-switching network, each LSR along an LSP strips off an existing label associated with a given packet and applies a new label to the given packet prior to forwarding to the next LSR in the LSP. The new label informs the next router in the path how to further forward the packet to a downstream node in the MPLS network eventually to a downstream LER that can properly forward the packet to a destination.

MPLS service providers have been using unicast technology to enable communication between a single sender and a single receiver in label-switching networks. The term unicast exists in contradistinction to multicast (or point to multipoint "P2MP"), which involves communication between a single sender and multiple receivers. Both of such communication techniques (e.g., unicast and multicast) are supported by Internet Protocol version 4 (IPv4).

Service providers have been using so-called unicast Fast Reroute (FRR) techniques for quite some time to provide more robust unicast communications. In general, fast rerouting includes setting up a backup path for transmitting data in the event of a network failure so that a respective user continues to receive data even though the failure occurs.

In multicast networks, Reverse Path Forwarding (RPF) techniques are used in building source-specific forwarding paths such that the multicast traffic can flow more efficiently without forwardwarding loops. A network employing RPF issues source-specific joins towards the source node while using the source address to look up a unicast routing table entry. This upstream process continues router by router until the source is reached. The upstream routers then are able to forward the multicast traffic downstream toward the original join. In essence, the traffic is forwarded along the reverse path from the source back to the listener.

SUMMARY

Conventional mechanisms such as those explained above suffer from a variety of shortcomings. More specifically, label-switching networks that are capable of rerouting P2MP traffic are susceptible to transmitting and receiving duplicate P2MP traffic at various network nodes upon the occurrence of a respective link or node failure in the network. For example, during a fast reroute operation in a multicast network a particular node (e.g., router) may receive duplicate traffic from both the fast reroute backup path and the new upstream multicast path created during network convergence. As such, the reception of duplicate traffic at network entities can significantly encumber network throughput while resulting in noticeable performance degradation by users interacting with the network.

Embodiments of the invention significantly overcome such shortcomings and provide mechanisms and techniques for minimizing or preventing duplicate traffic during point to multipoint tree switching in a network. In its operation, embodiments disclosed herein utilize control plane trigger mechanisms to handle the receipt of duplicate traffic by network entities after the occurrence of a network failure event. Essentially, the control plane trigger mechanism prevents a network entity from processing multicast traffic from both old and new upstream data paths resulting from typical network convergence procedures. The methods and apparatus described herein apply to standard rerouting procedures as well as fast rerouting procedures for multicast traffic in a network.

In a particular embodiment of a method for minimizing duplicate traffic during P2MP tree switching in a network including a P2MP tree with a source node, the method includes transmitting multicast data traffic from a first router over a primary network path to a second router, wherein the network path supports multicast label switching of multicast data traffic. The method further includes, in response to detecting a failure in the network, initiating a multicast rerouting procedure that comprises, I) transmitting a new switching label via a secondary network path to an upstream router, wherein the secondary network path includes at least one upstream node; and II) upon receiving an acknowledgement notification from the upstream router via the secondary network path, configuring the second router to receive multicast data traffic from the secondary network path in lieu of receiving multicast data traffic from the primary network path.

Alternatively, the method includes configuring the network to include at least one backup path between the first router and the second router, wherein the backup path supports multicast label switching of multicast data traffic. The method also includes, in response to detecting the failure in the network, initiating transmission of the multicast data traffic over the at least one backup path between the first router and the second router in lieu of transmitting the multicast data traffic over the primary network path. In addition, the method further includes, upon receiving an acknowledgement notification from the upstream router via the secondary network path, configuring the second router to receive multicast data traffic from the secondary network path in lieu of receiving multicast data traffic from the at least one backup path.

Other embodiments include a computer readable medium having computer readable code thereon for providing a method for minimizing duplicate traffic during P2MP switching in a network including a P2MP tree with a source node. The computer readable medium also includes instructions operable on a processor to transmit multicast data traffic from a first router over a primary network path to a second router, wherein the network path supports multicast label switching of multicast data traffic. The computer readable medium further includes, in response to detecting a failure in the network, instructions operable on a processor to initiate a multicast rerouting procedure, wherein the multicast rerouting procedure comprises, I) instructions operable on a processor to transmit a new switching label via a secondary network path to an upstream router, wherein the secondary network path includes at least one upstream node; and II) upon receiving an acknowledgement notification from the upstream router via the secondary network path, instructions operable on a processor to configure the second router to receive multicast data traffic from the secondary network path in lieu of receiving multicast data traffic from the primary network path. In addition, the computer readable medium includes instructions operable on a processor to configure the network to include at least one backup path between the first router and the second router, wherein the backup path supports multicast label switching of multicast data traffic. Further, the computer readable medium includes, in response to detecting the failure in the network, instructions operable on a processor to initiate transmission of the multicast data traffic over the at least one backup path between the first router and the second router in lieu of transmitting the multicast data traffic over the primary network path. The computer readable medium also includes, upon receiving an acknowledgement notification from the upstream router via the secondary network path, instructions operable on a processor to configure the second router to receive multicast data traffic from the secondary network path in lieu of receiving multicast data traffic from the at least one backup path.

Still other embodiments include a computerized device configured to process all the method operations disclosed herein as embodiments of the invention. In such embodiments, the computerized device includes a memory system, a processor, communications interface in an interconnection mechanism connecting these components. The memory system is encoded with a process that provides a method for method for minimizing duplicate traffic during P2MP tree switching in a network as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method for minimizing duplicate traffic during P2MP tree switching in a network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

The multicast techniques in this disclosure can be used to extend the multicast FRR backup path procedure as discussed in U.S. patent application Ser. No. 11/336,457, the entire teachings of which are incorporated herein by reference, to include multicast FRR backup path tunnels along with other techniques germane to forwarding multicast data in a label-switching network.

Note that techniques herein are well suited for use in applications such as label-switching networks that support routing of multicast data traffic. However, it should be noted that configurations herein are not limited to use in such applications and thus configurations herein and deviations thereof are well suited for other applications as well.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the methods and apparatus for minimizing duplicate traffic during P2MP tree switching in a network, as illustrated in the accompanying drawings in which like reference characters refer to the same parts throughout the different views. The drawings are not necessarily to scale, emphasis instead being placed upon illustrating the principles of the methods and apparatus for minimizing duplicate traffic during P2MP tree switching in a network.

DETAILED DESCRIPTION

Figure 1:
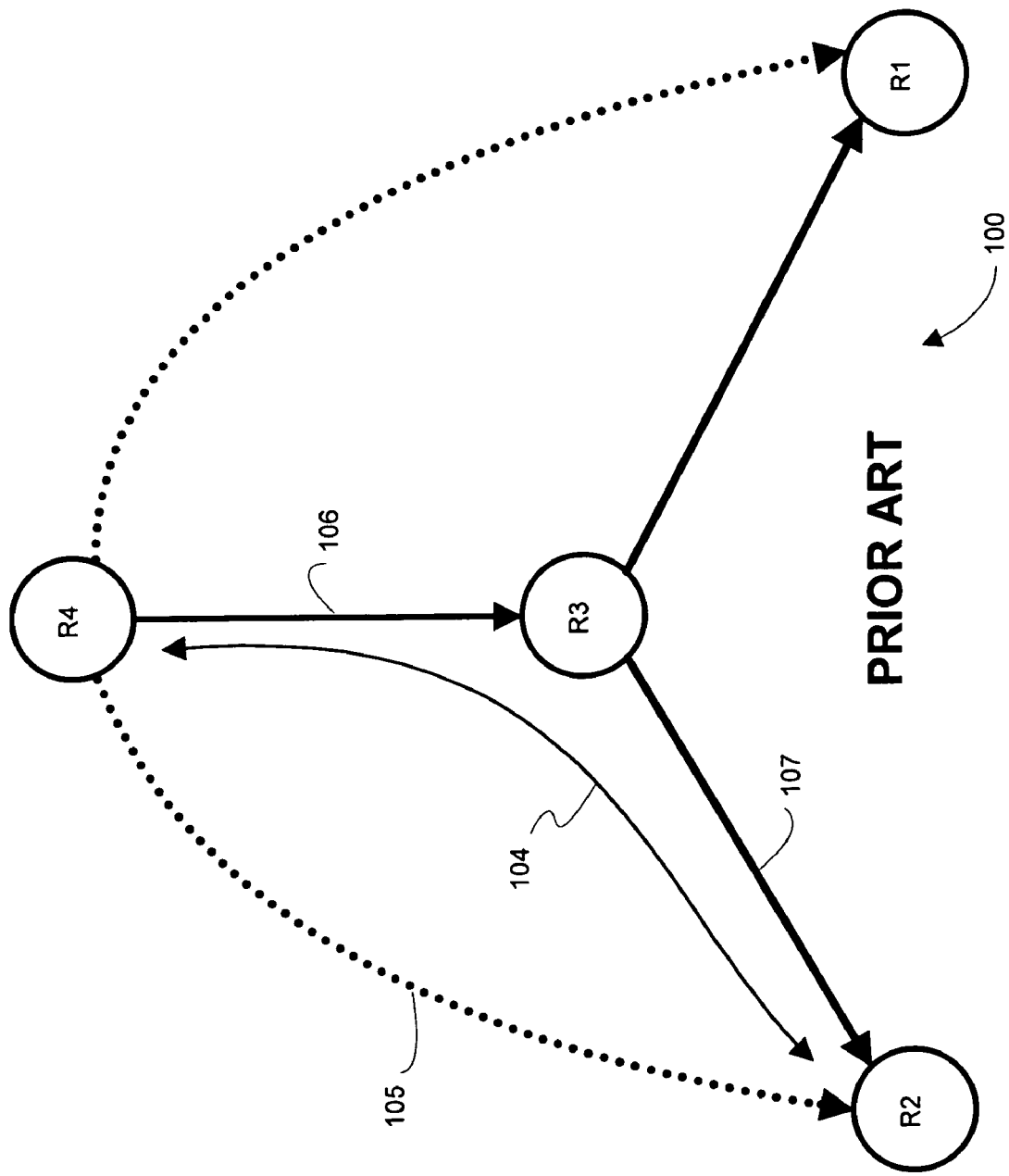
FIG. 1 depicts a block diagram of a network environment performing fast rerouting procedures involving various routers in a network.

FIG. 1 is a diagram of a network 100 (e.g., a communication system such as a label-switching network) in which data communication devices such as routers support point-to-multipoint communications according to an embodiment herein. Note that the term "router" herein refers to any type of data communication device that supports forwarding of data in a network. The term router as used herein then may include a switch, hub or other device that can support point-to-multipoint communications. Routers can be configured to originate data, receive data, forward data, etc. to other nodes or links in network 100.

As shown, network 100 (e.g., a label-switching network) such as that based on MPLS (Multi-Protocol Label Switching) includes router R1, router R2, router R3, and router R4 for forwarding multicast data traffic (i.e. multicast data communications) over respective communication links such as primary network path 104, communication link 106, and communication link 107. Router R1 and router R2 can deliver data traffic (i.e., communication) directly to host destinations or other routers in a respective service provider network towards a respective destination node. Note that network 100 can include many more routers and links than as shown in example embodiments of FIGS. 1 through 6. The possible inclusion of additional routers and links is particularly exemplified in FIGS. 1 through 6 by the use of dotted lines between network entities.

In one embodiment, multicast data traffic transmitted through network 100 are sent as serial streams of data packets. The data packets are routed via use of label-switching techniques. For example, network 100 can be configured to support label switching of multicast data traffic from router R4 (e.g., a root router) to respective downstream destination nodes such as router R1, router R2 and router R3.

Figure 2:
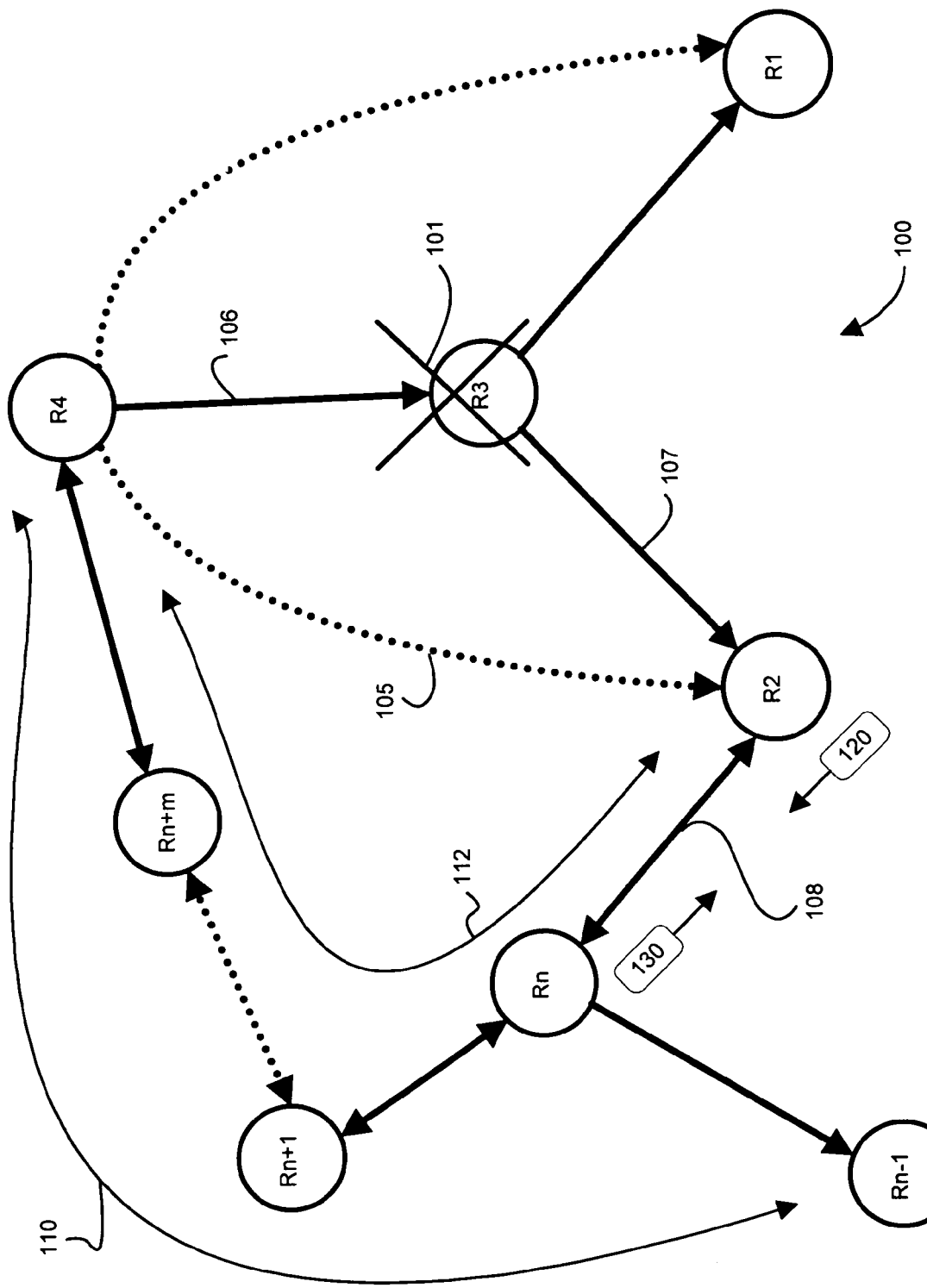
FIG. 2 depicts a block diagram of a network environment performing techniques for minimizing duplicate traffic during P2MP tree switching in light of a fast reroute operation.

In referencing the example configuration depicted in FIG. 2, during a link/node failure 101, router R4 forwards multicast data traffic via "next hop"/"next next hop" (NHOP/NNHOP) tunnels to NHOP/NNHOP nodes in accordance with fast reroute techniques disclosed in U.S. patent application Ser. No. 11/336,457, filed Jan. 20, 2006, the entire teachings of which are incorporated herein by reference. In this example, router R4 forwards multicast data traffic through backup path 105 to router R2 (e.g., a next hop downstream router) instead of transmitting data packets over primary network path 104 to router R2 as shown in FIG. 1.

Router R2 starts a stale timer and initiates multicast LDP signaling (e.g., RPF) in order to establish a new multicast tree connection with the root node (e.g., R4). As shown in FIG. 2, in initiating the reverse path towards the root node R4, router R2 sends a label mapping message 120 with a new label toward a new upstream node (router Rn in this example) via communications link 108. Since, according to this example, router Rn is in the existing P2MP tree 110, router Rn will add the new label to its routing table so as to include R2 as part of the existing P2MP tree 110. In response, router Rn sends an acknowledgement notification message (ACK) 130 back to router R2 via communications link 108. Upon receiving the ACK 130, router R2 removes the old label rewrite and sends a label release for the old label. Even though router R2 receives traffic from both old and new previous hops, router R2 will sink the traffic from the old previous hop. Thus, in this particular embodiment router R2 will now only receive P2MP tree 110 traffic from the newly established multicast path 112 (e.g., tunnel) in lieu of receiving multicast traffic (e.g., P2MP tree 110 traffic) from backup path 105. Stated differently, router R2 will not use the duplicate multicast traffic since router R2 terminated the backup (or old) path 105 upon establishing the new P2MP tree path 112.

Figure 3:
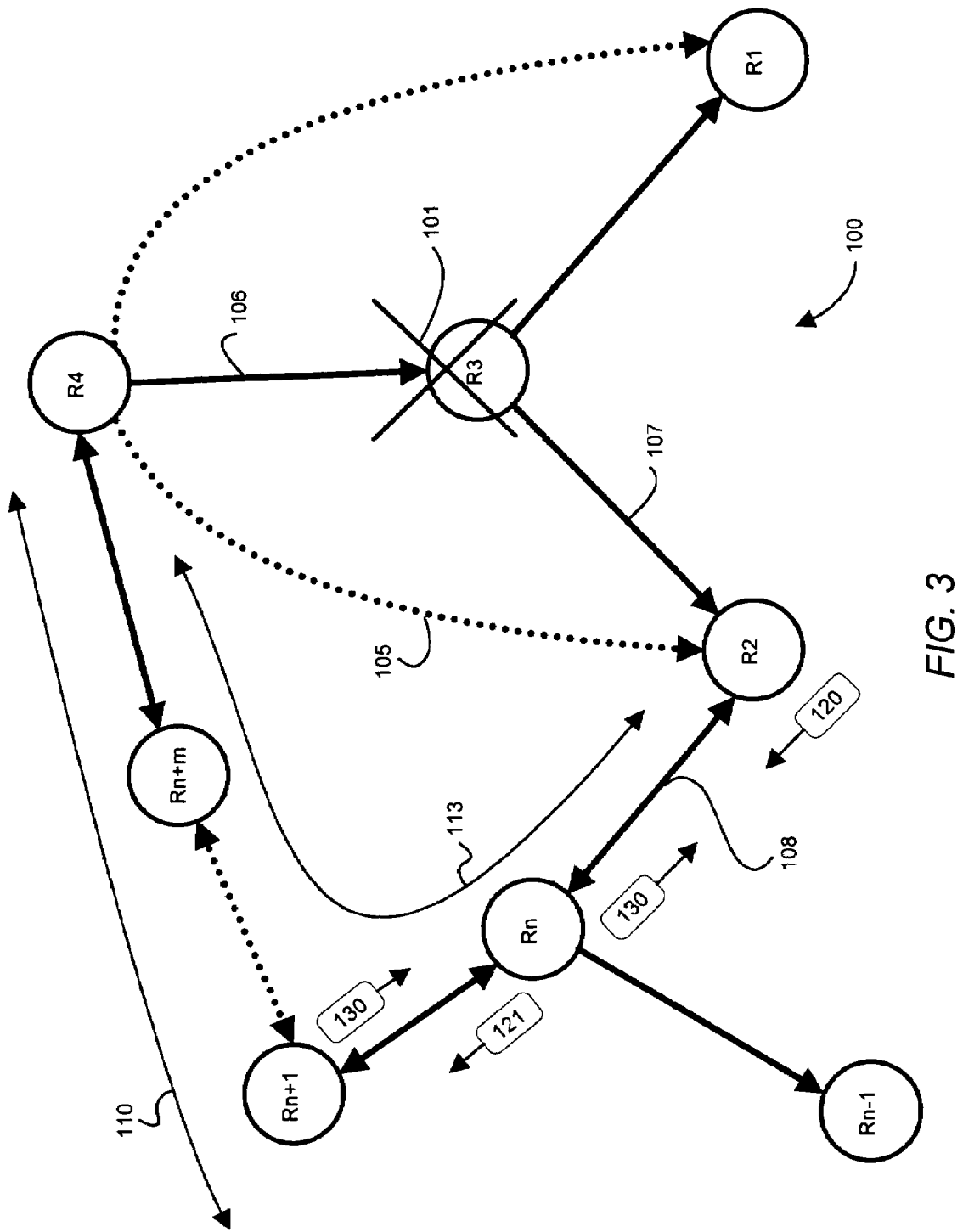
FIG. 3 depicts a block diagram of a network environment performing techniques for minimizing duplicate traffic during P2MP tree switching in light of a fast reroute operation.

FIG. 3 shows a similar network configuration 100 in which router R2 initiates multicast LDP signaling upon detecting a link/node failure 101. However, in this example configuration router Rn is not in the existing P2MP tree 110. Therefore, upon receiving the label mapping message 120 from router R2, router Rn sends a new label mapping message 121 with a new label to its upstream node (router Rn+1 in this example). Router Rn+1 is in the existing P2MP tree 110. Similar to the example discussed above, upon receiving the new label mapping message 121 from router Rn, router Rn+1 adds the new label mapping message 121 to its routing table so as to include Rn (and any downstream nodes thereof) as part of the existing P2MP tree 110. Router Rn+1 then sends an ACK 130 back to router Rn. In turn, router Rn propagates the ACK 130 back to router R2. Upon receiving the ACK 130, router R2 removes the old label rewrite and sends a release for the old label. Thus, in this particular embodiment router R2 will now only receive multicast traffic from the newly established path multicast path 113 (e.g., tunnel) in lieu of receiving multicast traffic from backup path 105. In other words, router R2 will not use the duplicate multicast traffic since router R2 terminated the backup path 105 upon establishing the new P2MP tree path 113.

In alternate embodiments, the multicast LDP signaling process described may be extrapolated (as evidenced by the dotted lines in the figures) such that the label mapping messages are sent upstream in the network 100 through as many upstream nodes as necessary to reach a node in the existing P2MP tree 110. In this manner, each upstream node Rn, Rn+1 . . . Rn+m stemming from router R2 continues to send label mapping messages upstream until a merging point is reached with a node in the existing P2MP tree 110. Accordingly, the first node reached in the P2MP tree 110 propagates an ACK 130 back downstream through respective nodes Rn+m . . . Rn+1, Rn until the ACK 130 reaches router R2 where, upon receipt, router R2 removes the old rewrite and sends a label release for the old label.

It should be noted that in the embodiments described above where a new P2MP path is established through multicast LDP signaling to an upstream node in the P2MP tree 110, router R2 cannot be certain of the state of the P2MP tree 110. In other words, the ACK 130 received by router R2 from an upstream node does not contain information as to whether the P2MP tree is in a new, old or pre-convergence state (e.g., the state of multicast paths 111 and 113 in FIGS. 2 and 3, respectively). As such, these procedures do not completely eliminate the possibility of duplicate traffic. This is because the new P2MP path may associate with pre-convergence multicast tree that will subsequently become obsolete upon network convergence. Nonetheless, such signaling procedures can be accomplished in one or two milliseconds. In addition, the forwarding plane cleanup time is proportional to the number of rewrites processed at the upstream nodes (e.g., Rn, Rn+1, . . . ). This adds the variable delay in quenching the duplicate traffic. Since the duplicate traffic can only be reduced from minutes to milliseconds (ms), the strict time boundary is not possible with this signaling procedure. Generally, if the traffic disruption is less than 300 ms, most real applications can tolerate the disruption.

In another embodiment, the duplication of multicast traffic is completely eliminated at a network node that implements fast reroute procedures during P2MP tree switching. In particular, duplicate traffic is eliminated by propagating new label mapping messages upstream to the root node (e.g., R4) of the P2MP tree 110 via a reverse path (e.g, multicast path 112 as shown in FIG. 2). If each upstream node in the reverse path allocates the local label for the new multicast tree, the root node will have two disjoint multicast trees (e.g., the old P2MP tree built before the reroute, and the new P2MP tree built after the reroute). Despite this, all leaf nodes can still receive traffic during the stale period (e.g., before the stale timer has elapsed) from the old P2MP tree built before the reroute. As a result, some broken tree nodes may also receive multicast traffic from NHOP or NNHOP backup LSP's. However, after network convergence, the root/source node can switch the multicast traffic from the old P2MP tree to the new P2MP tree such that there is no traffic loss or duplication. Furthermore, the upstream nodes with local labels for the new P2MP tree remove the old labels for the old P2MP tree after the stale timer expires by sending label release messages with the old labels.

Figure 4:
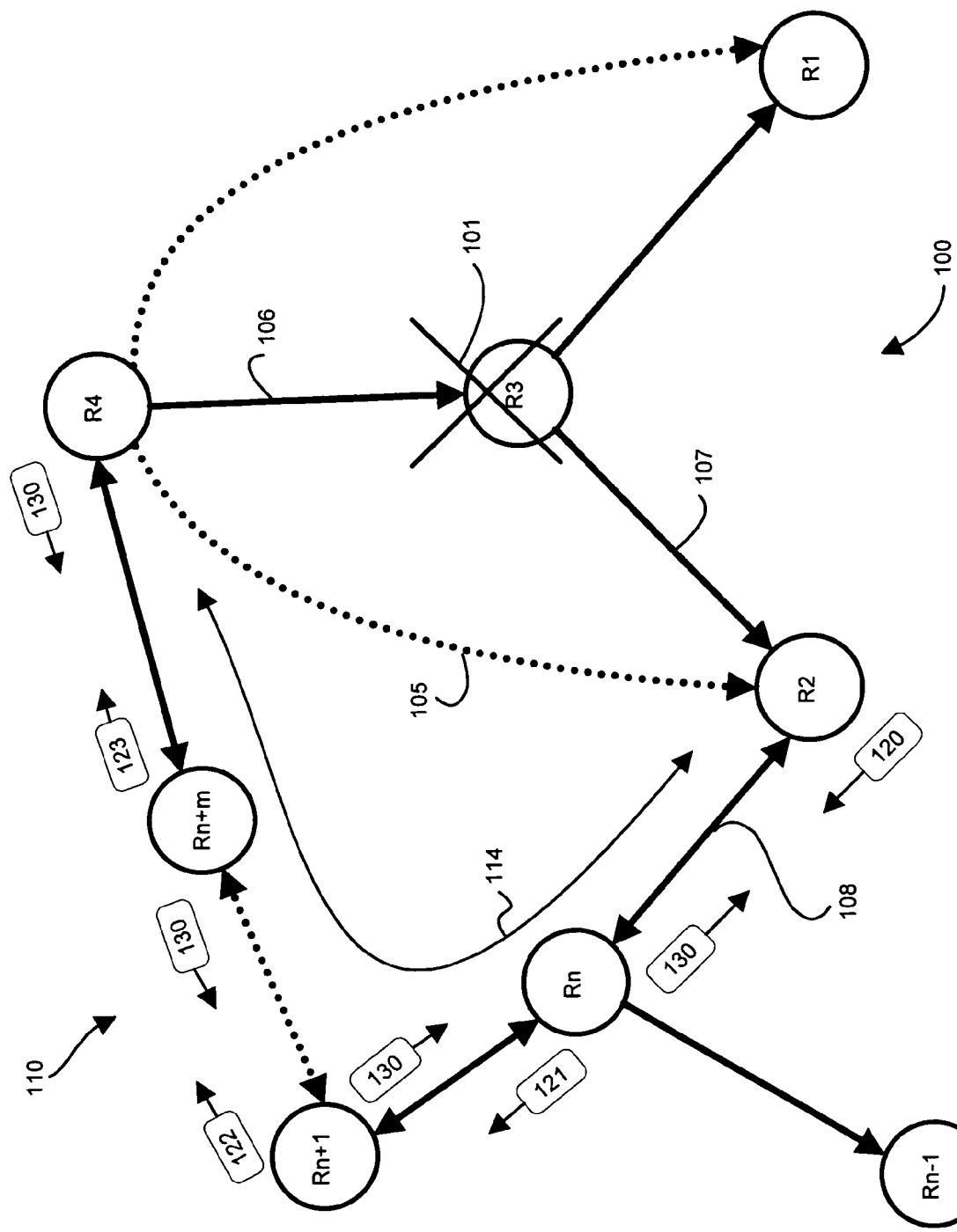
FIG. 4 depicts a block diagram of a network environment performing techniques for minimizing duplicate traffic during P2MP tree switching in light of a fast reroute operation.

FIG. 4 shows a particular embodiment that is exemplary of P2MP tree switching at the root node whereby the duplication and loss of multicast traffic are eliminated. Router R2 starts a stale timer and initiates multicast LDP signaling (e.g., RPF) in order to establish a new multicast tree connection with the root node (e.g., R4). Similar to previous embodiments already discussed, router R2 sends label mapping message 120 with a new label toward the upstream node (router Rn in this example). Upstream nodes Rn, Rn+1 . . . Rn+m propagate respective label mapping messages 121, 122 and 123 upstream until the label mapping messages reach the root node (e.g., R4 in this example). Accordingly, the root node R4 propagates an ACK 130 back downstream through nodes Rn+m . . . Rn+1, Rn via new P2MP tree path 114 (or reverse path 114), until the ACK 130 reaches router R2. Upon receipt of an ACK 130, each router along the new P2MP tree route (the reverse path between R2 and R4) removes the old rewrite labels and sends label releases for the old labels. As a result, router R2 will now receive multicast traffic from the new P2MP tree (via new P2MP tree path 114) in lieu of receiving multicast traffic from the fast reroute backup path 105.

Figure 5:
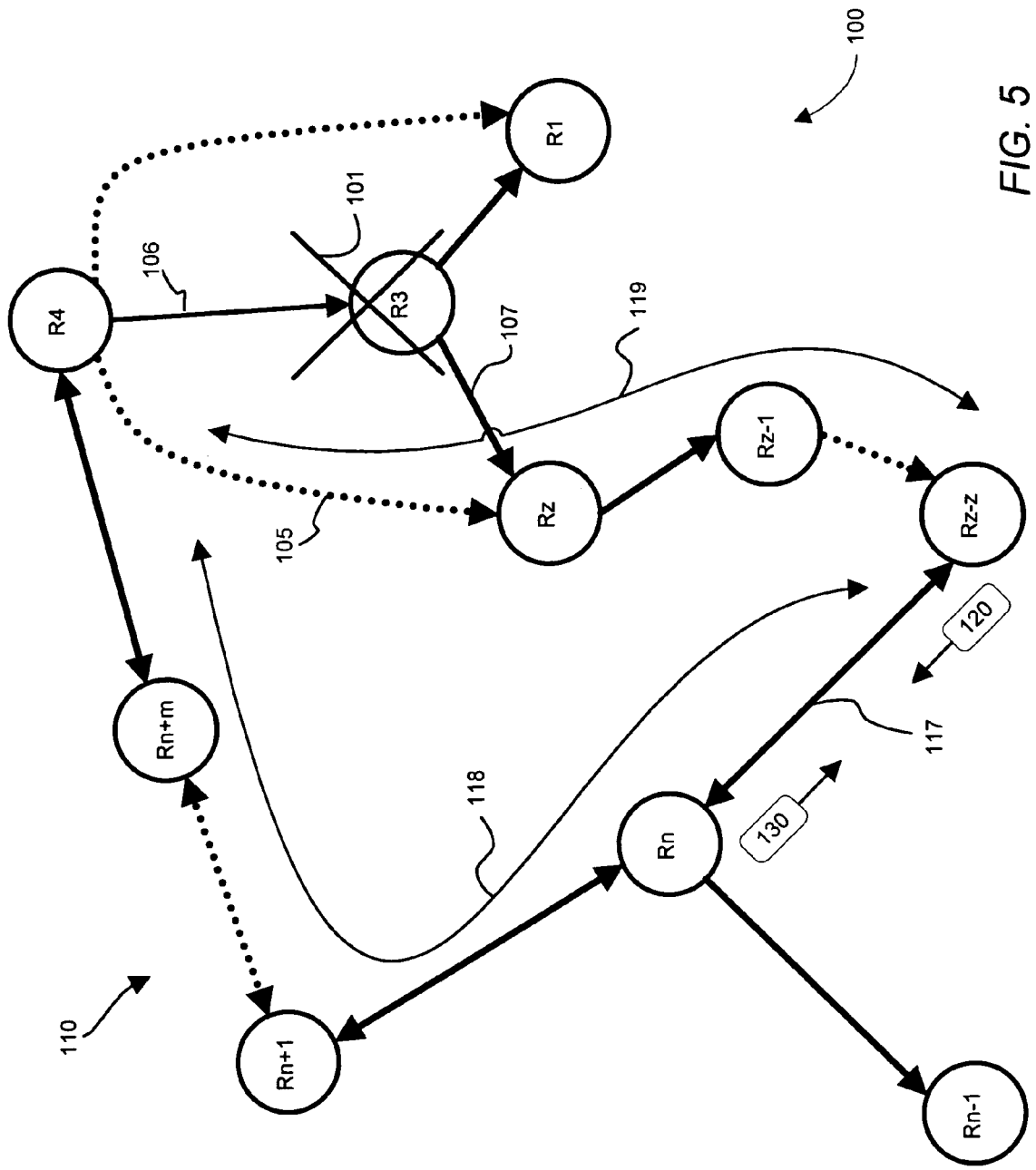
FIG. 5 depicts a block diagram of a network environment performing techniques for minimizing duplicate traffic during P2MP tree switching in light of a standard reroute operation.

In alternate embodiments, the reception of duplicate multicast traffic at network nodes may occur during standard reroute procedures. For example, FIG. 5 shows a network 100 configured to support label-switching of multicast data traffic from router R4 (e.g., a root router) to respective downstream destination nodes such as R1, R3, Rz, and Rz-1 . . . Rz-z. Router Rz-z is a non-adjacent downstream node from router Rz and is not directly subject to a fast reroute operation were an upstream node/link failure to occur. In other words, Rz-z does not have a predetermined upstream backup path for receiving multicast traffic in the event of an upstream network anomaly. However, router Rz-z is still susceptible to receiving duplicate multicast traffic after an upstream link/node failure. Upon detecting an upstream node/link failure, router Rz-z immediately initiates multicast LDP signaling (e.g., RPF) in order to establish a new multicast tree connection with the root node (e.g., R4). However, router Rz-z may still receive multicast traffic from the upstream node, router Rz, since router Rz may still receive multicast traffic via backup path 105 as a result of the fast reroute implementation. Thus, router Rz-z is an indirect beneficiary of the fast reroute procedures applied to its upstream nodes (e.g., Rz as one example).

For example, in referring to FIG. 5, assume that during a link/node failure 101, router Rz-z initiates multicast LDP signaling (e.g., RPF) in order to establish a new multicast tree connection with root node R4. Similar to methods previously discussed, router Rz-z sends a new label mapping message 120 to upstream router Rn via upstream path communications link 117. In one embodiment, label mapping messages are propagated upstream until a node in the P2MP tree 110 is reached. Thus, in referring to FIG. 5, label mapping messages are propagated upstream through path 118 via Rn, Rn+1 . . . Rn+m until a router in the P2MP tree 110 is reached. Assume for this example that Rn is in the P2MP tree 110. If so, upon receiving the new label mapping message 120, Rn sends an ACK 130 back to Rz-z. Upon receiving the ACK 130, router Rz-z removes the old label rewrite and sends a release for the old label. Thus, in this particular embodiment non-adjacent, downstream router Rz-z will now only receive P2MP tree 110 traffic from the newly established path 118 (e.g., tunnel) via router Rn in lieu of receiving multicast traffic from the previous path 119.

It should be noted that in the embodiments described above where a new P2MP path is established through multicast LDP signaling to an upstream node in the P2MP tree 110, router Rz-z cannot be certain of the state of the P2MP tree 110. In other words, the ACK 130 received by router Rz-z from an upstream node does not contain information as to whether the P2MP tree 110 is in a new, old or pre-convergence state. As such, these procedures do not completely eliminate the possibility of duplicate traffic for reasons already described.

In another embodiment, the duplication of multicast traffic is completely eliminated at a network node that implements standard reroute procedures during P2MP tree switching.

Figure 6:
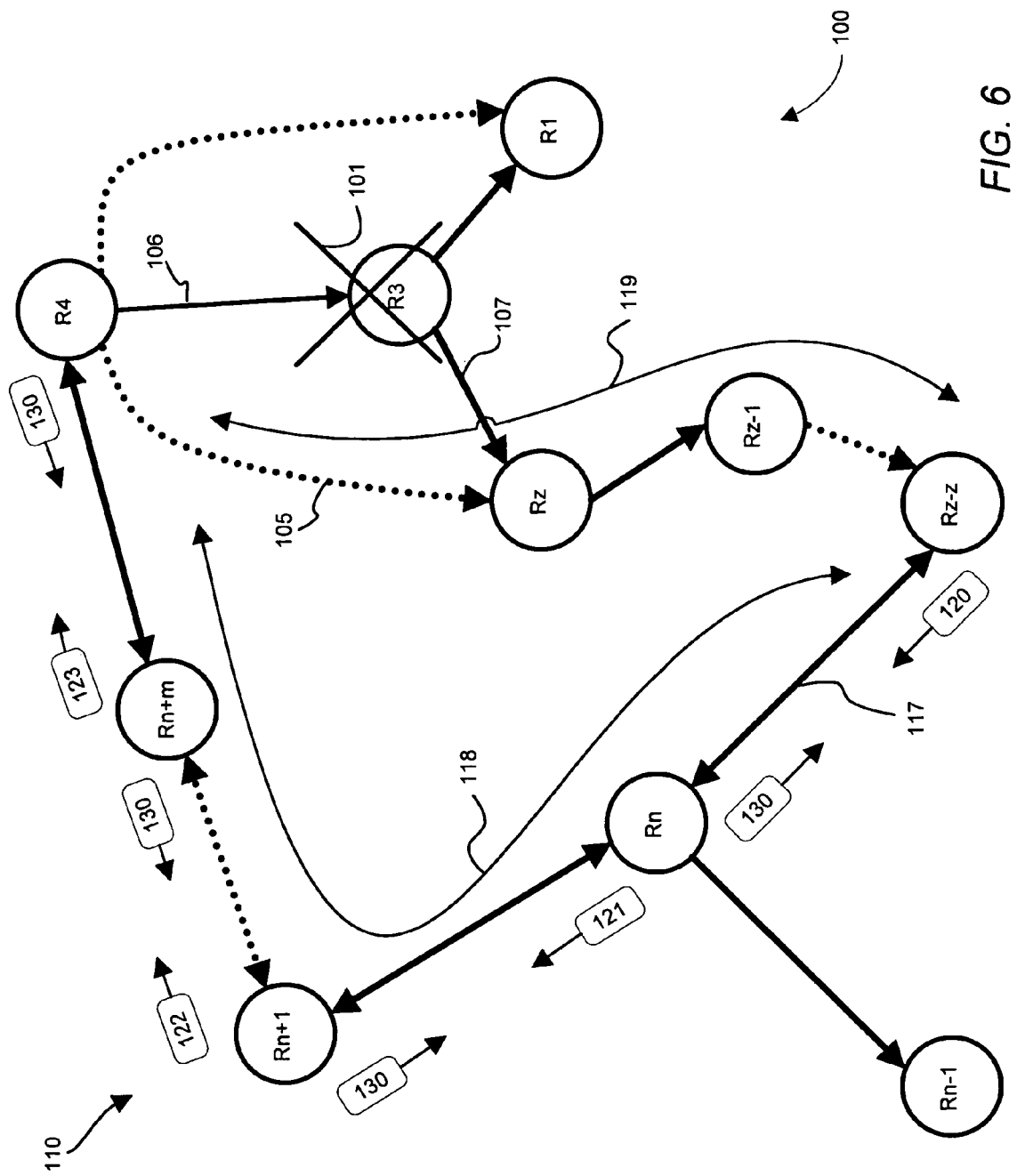
FIG. 6 depicts a block diagram of a network environment performing techniques for minimizing duplicate traffic during P2MP tree switching in light of a standard reroute operation.
Figure 7:
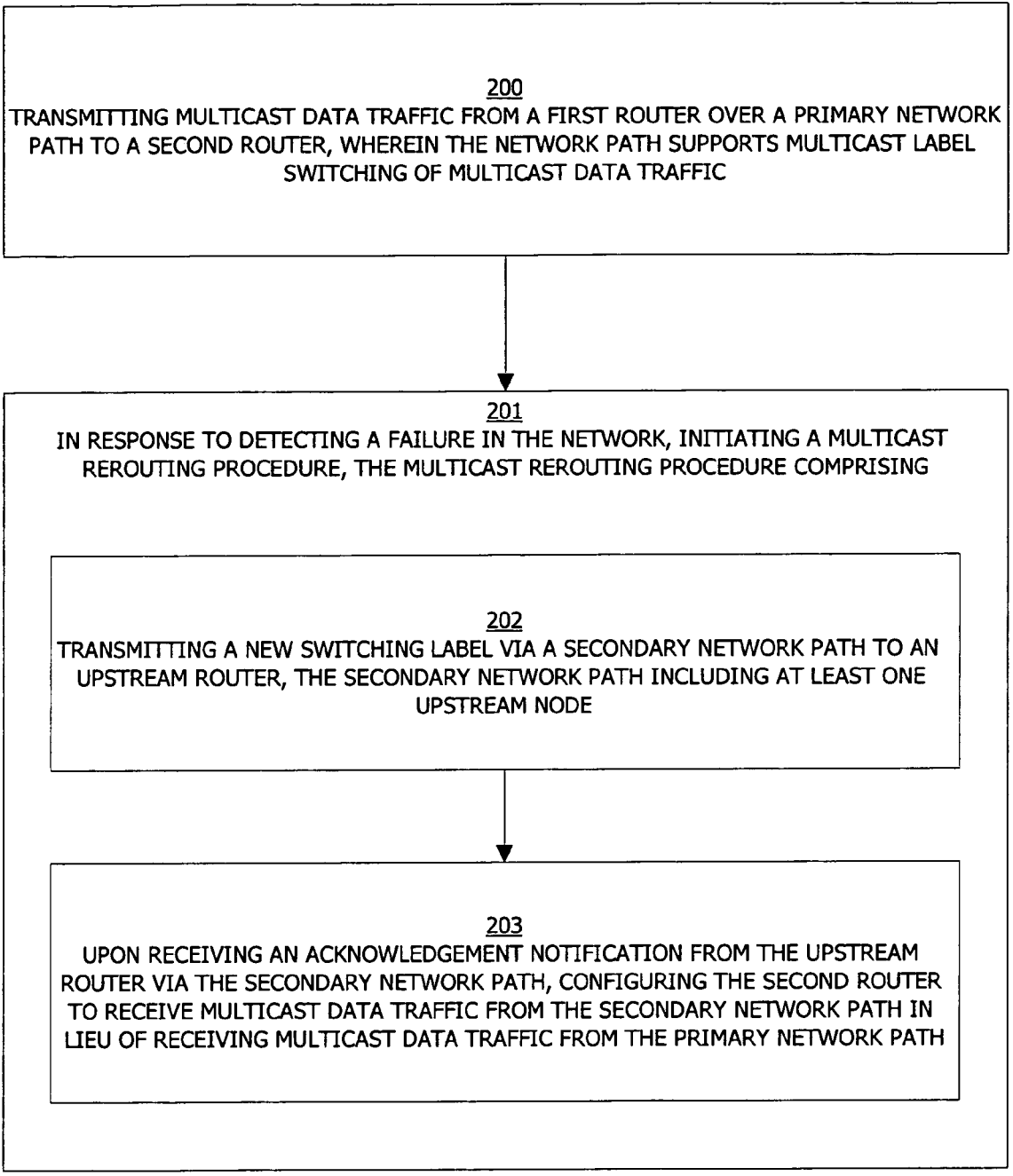
FIGS. 7 through 10 depict flow diagrams of particular methods for minimizing duplicate traffic during P2MP tree switching in a network.

FIG. 6 shows a particular embodiment of P2MP tree switching at the root node whereby the duplication and loss of multicast traffic are eliminated at a node (e.g., Rz-z) implementing standard reroute procedures. Similar to previous embodiments already discussed, upon detecting the link/node failure 101, router Rz-z sends label mapping message 120 with a new label toward the upstream node (router Rn in this example). Upstream nodes Rn, Rn+1 . . . Rn+m propagate respective label mapping messages 121, 122 and 123, upstream until the label mapping messages reach the root node (e.g., R4 in this example). Accordingly, the root node R4 propagates an ACK 130 back downstream through nodes Rn+m . . . Rn+1, Rn via new P2MP tree path 118 (or reverse path 114), until the ACK 130 reaches router Rz-z. Upon receipt of an ACK 130, each router along the new P2MP tree route 118 (the reverse path between Rz-z and R4) removes the old rewrite labels and sends label releases for the old labels. As a result, router Rz-z will receive multicast traffic from new P2MP tree path 118 in lieu of receiving multicast traffic from the previous network path 119.

Flow charts of the presently disclosed methods are depicted in FIGS. 7 through 10. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

FIGS. 7 through 10 are flow charts that show processing details of a method for minimizing duplicate traffic during P2MP tree switching in a network including a P2MP tree with a source node is shown. The method begins with processing block 200 which discloses transmitting multicast data traffic from a first router over a primary network path to a second router. In this configuration, the network path supports multicast label switching of multicast data traffic.

Processing block 201 then states, in response to detecting a failure 101 in the network 100, initiating a multicast rerouting procedure. This was discussed above in reference to the networking diagrams in FIGS. 1 through 6. As per one aspect of the multicast rerouting procedure, processing block 202 recites transmitting a new switching label via a secondary network path to an upstream router (as previously discussed with reference to FIGS. 2 through 6). In this configuration, the secondary network path includes at least one upstream node. An additional aspect of the multicast rerouting procedure is stated in processing block 203 which discloses, upon receiving an acknowledgement notification from the upstream router via the secondary network path, configuring the second router to receive multicast data traffic from the secondary network path in lieu of receiving multicast data traffic from the primary network path (as previously discussed with reference to FIGS. 2 through 6).

Figure 8:
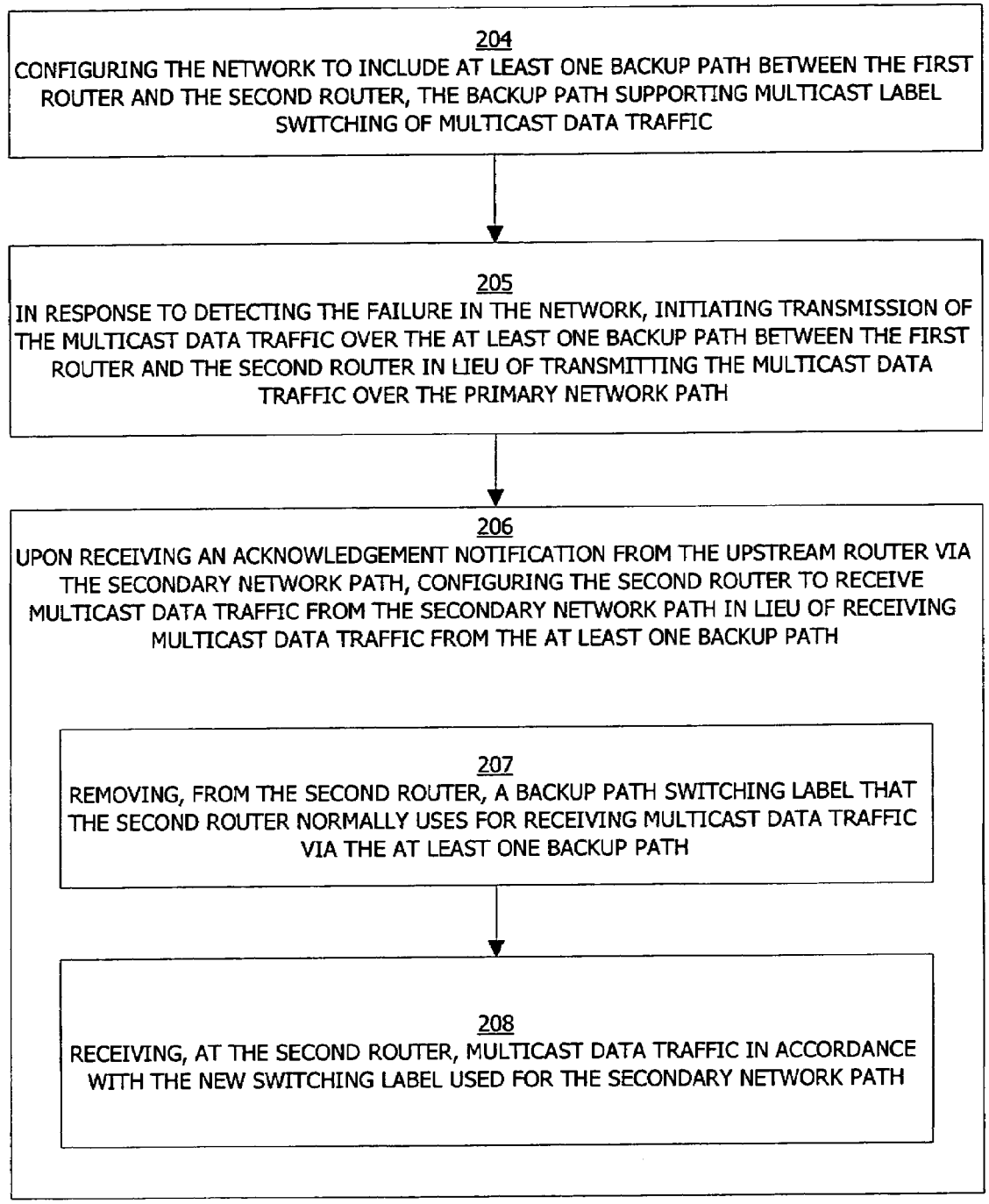

The method continues with processing block 204 in FIG. 8, which discloses configuring the network to include at least one backup path between the first router and the second router (as previously discussed with reference to fast rerouting procedures specifically shown in FIG. 1). In such a configuration, the backup path supports multicast label switching of multicast data traffic. In addition, processing block 205 states, in response to detecting the failure in the network, initiating transmission of the multicast data traffic over the at least one backup path between the first router and the second router in lieu of transmitting the multicast data traffic over the primary network path. Stated differently, a backup path is established between the first router and the second router in accordance with multicast fast rerouting procedures as shown in FIG. 1. Processing block 206 recites, upon receiving an acknowledgement notification from the upstream router via the secondary network path, configuring the second router to receive multicast data traffic from the secondary network path in lieu of receiving multicast data traffic from the at least one backup path (as previously discussed with reference to FIGS. 2 through 4 in light of fast rerouting procedures).

Processing block 207 additionally states removing, from the second router, a backup path switching label that the second router normally uses for receiving multicast data traffic via the at least one backup path. Further, processing block 208 discloses receiving, at the second router, multicast data traffic in accordance with the new switching label used for the secondary network path (as previously discussed with reference to FIGS. 2 through 4 in light of fast rerouting procedures).

Figure 9:
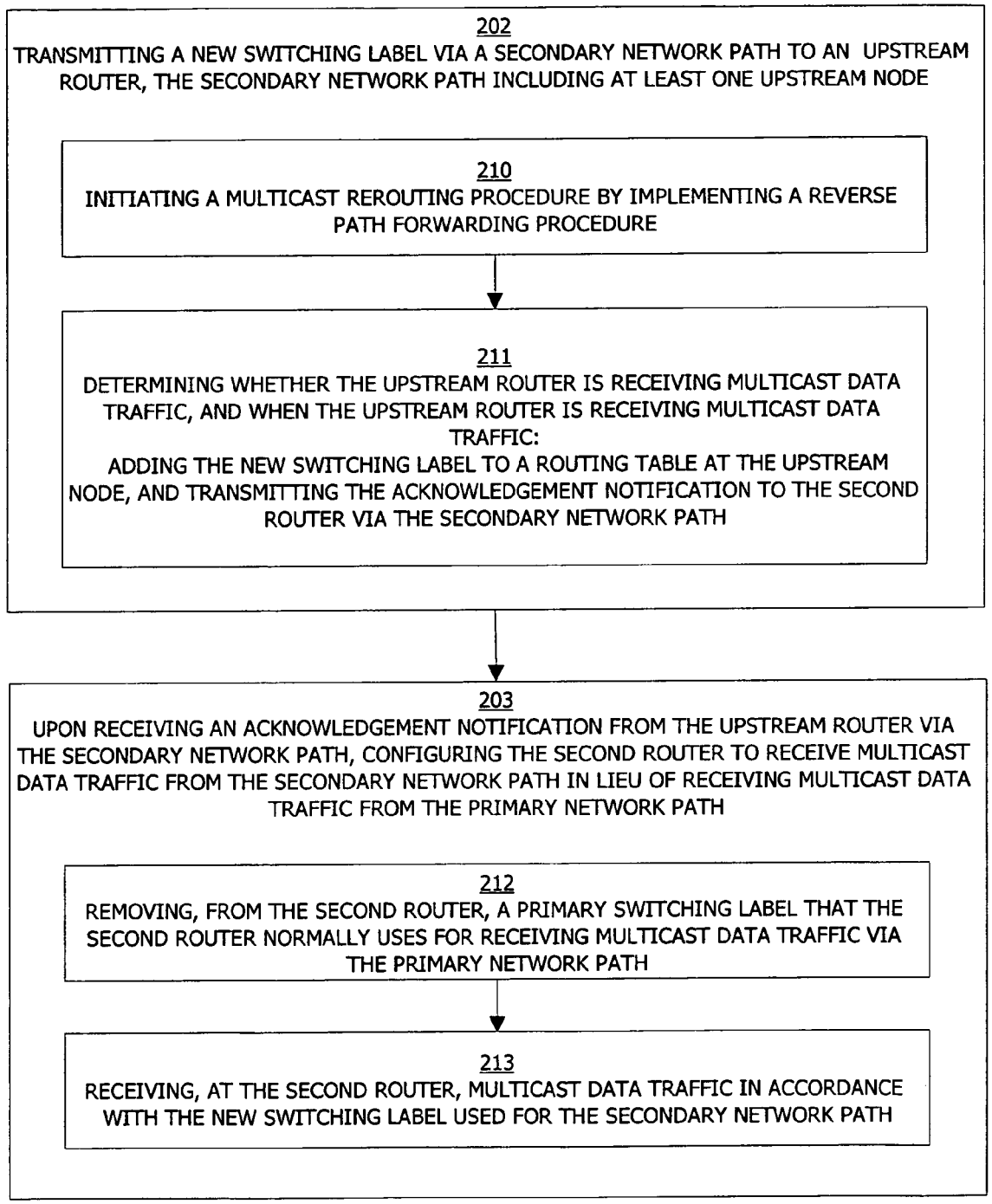

In FIG. 9, the method continues with processing block 210 which discloses initiating a multicast rerouting procedure by implementing a reverse path forwarding procedure (as previously discussed with reference to FIGS. 2 through 6). Processing block 211 further states determining whether the upstream router is receiving multicast data traffic, and when the upstream router is receiving multicast data traffic, adding the new switching label to a routing table at the upstream node. In addition, processing block 211 discloses transmitting the acknowledgement notification to the second router via the secondary network path (as previously discussed with reference to FIGS. 2 through 6).

Processing block 212 recites removing, from the second router, a primary switching label that the second router normally uses for receiving multicast data traffic via the primary network path. Processing block 213 states receiving, at the second router, multicast data traffic in accordance with the new switching label used for the secondary network path (as previously discussed with reference to FIGS. 2 through 6).

Figure 10:
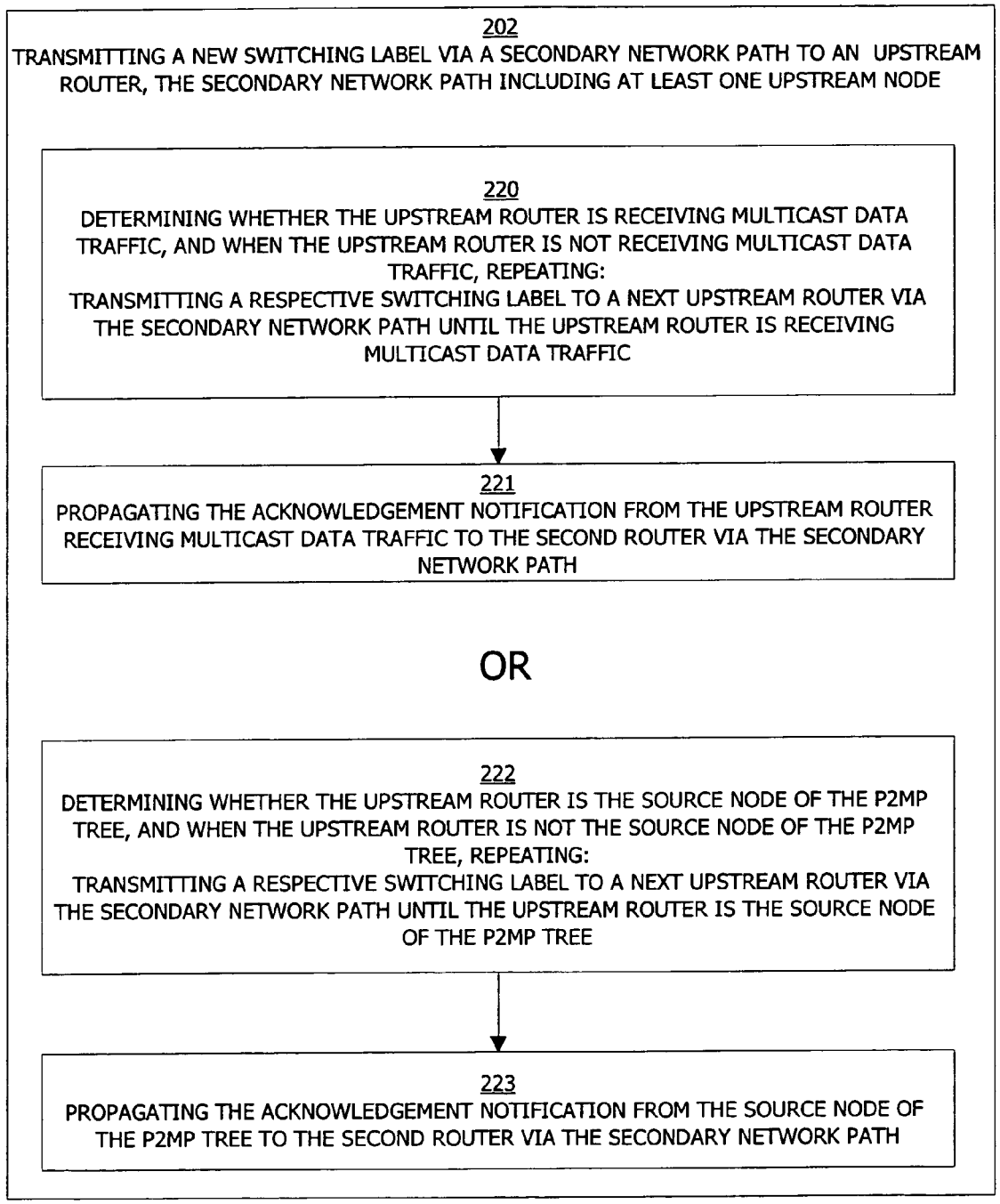

As per FIG. 10, processing block 220 recites determining whether the upstream router is receiving multicast data traffic, and when the upstream router is not receiving multicast data traffic, repeating the step of transmitting a respective switching label to a next upstream router via the secondary network path until the upstream router is receiving multicast data traffic. Processing block 221 also states propagating the acknowledgement notification from the upstream router receiving multicast data traffic to the second router via the secondary network path (as previously discussed with reference to FIGS. 3 and 5).

The method still further continues with processing block 222 which discloses determining whether the upstream router is the source node of the P2MP tree, and when the upstream router is not the source node of the P2MP tree, repeating the steps of transmitting a respective switching label to a next upstream router via the secondary network path until the upstream router is the source node of the P2MP tree. Further, processing block 223 states propagating the acknowledgement notification from the source node of the P2MP tree to the second router via the secondary network path (as previously discussed with reference to FIGS. 4 and 6).

Figure 11:
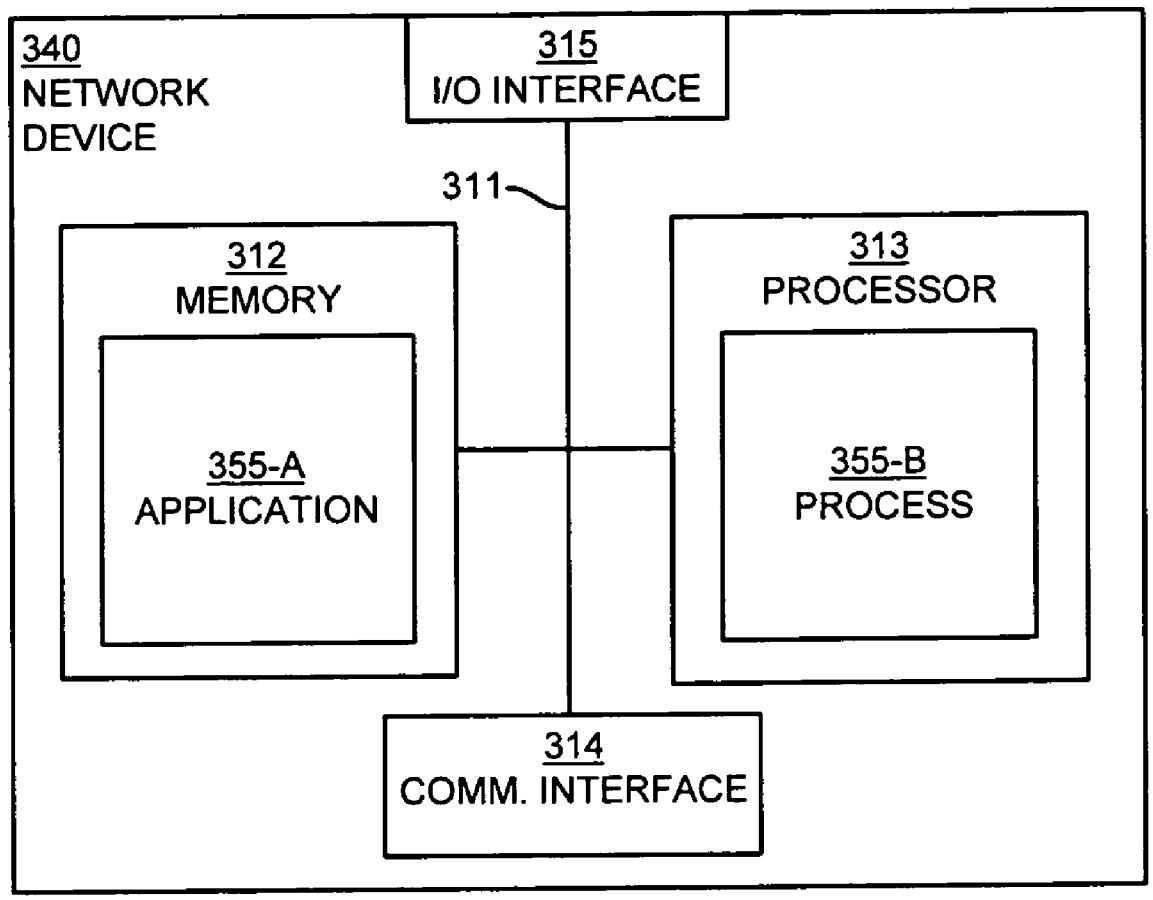
FIG. 11 illustrates an example network device architecture for a computer system that performs minimizing duplicate traffic during P2MP tree switching in a network.

FIG. 11 illustrates example architectures of a network device that is configured as a host computer system 340. The network device 340 may be any type of computerized system such as a personal computer, workstation, portable computing device, mainframe, server or the like. In this example, the system includes an interconnection mechanism 311 that couples a memory system 312, a processor 313, a communications interface 314, and an I/O interface 315. The communications interface 314 and I/O interface 315 allow the computer system 340 to communicate with external devices or systems.

The memory system 312 may be any type of computer readable medium that is encoded with an application 355-A that represents software code such as data and/or logic instructions (e.g., stored in the memory or on another computer readable medium such as a disk) that embody the processing functionality of embodiments of the invention for the agent 355 as explained above. The processor 313 can access the memory system 312 via the interconnection mechanism 311 in order to launch, run, execute, interpret or otherwise perform the logic instructions of the applications 355-A for the host in order to produce a corresponding agent process 355-B. In other words, the agent process 355-B represents one or more portions of the agent application 355-A performing within or upon the processor 313 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 312 (e.g., within random access memory or RAM). It is also to be understood that other embodiments of the invention can provide the applications operating within the processor 313 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What we claim is:

1. A method for minimizing duplicate traffic during point to multipoint (P2MP) tree switching in a network including a P2MP tree with a source node, the method comprising:
   receiving multicast data traffic transmitted from a first router over a primary network path to a second router, wherein the primary network path supports multicast label switching of multicast data traffic; and
   in response to detecting a failure in the network, receiving the multicast data traffic over a backup label switched path on a secondary network path between the first router and the second router in lieu of receiving the multicast data traffic over the primary network path and minimizing duplicate traffic by initiating a multicast rerouting procedure, the multicast rerouting procedure comprising:
   transmitting a new multicast switching label via the secondary network path to an upstream router, the secondary network path including the upstream router between the first router and the second router;
   and, upon receiving an acknowledgement notification from the upstream router indicating that the upstream router is a merge point in the P2MP tree, configuring the second router to receive multicast data traffic addressed to the new multicast switching label and transmitted from the upstream router over the secondary network path in lieu of receiving multicast data traffic from the backup label switched path prior to the PSMP tree reaching a convergent state after the failure.

2. A method as in claim 1 wherein initiating the multicast rerouting procedure by transmitting the multicast new switching label via the secondary network path to the upstream router comprises:
   initiating the multicast rerouting procedure by implementing a reverse path forwarding procedure.

3. A method as in claim 1 wherein initiating the multicast rerouting procedure by transmitting the new multicast switching label via the secondary network path to the upstream router comprises:
   determining whether the upstream router is receiving multicast data traffic, and when the upstream router is receiving multicast data traffic:
   adding the new multicast switching label to a routing table at the upstream router, and
   transmitting the acknowledgement notification to the second router via the secondary network path.

4. A method as in claim 1 wherein initiating the multicast rerouting procedure by transmitting new multicast switching label via the secondary network path to the upstream router comprises:
   determining whether an upstream node on the secondary network path is receiving multicast data traffic, and in response to a determination the upstream node is not receiving multicast data traffic:
   transmitting a respective switching label to a next upstream router via the secondary network path in response to a determination the upstream node is not receiving multicast data traffic; and
   propagating the acknowledgement notification from the upstream router receiving multicast data traffic to the second router via the secondary network path.

5. A method as in claim 1 wherein initiating the multicast rerouting procedure further comprises:
   determining whether the upstream router is the source node of the P2MP tree, and in response to a determination the upstream router is not the source node of the P2MP tree, transmitting a respective switching label to a next upstream router via the secondary network path until the source node of the P2MP tree is reached; and
   propagating the acknowledgement notification from the source node of the P2MP tree to the second router via the secondary network path.

6. A method as in claim 1 wherein the configuring the second router to receive multicast data traffic from the secondary network path comprises:
   removing, from the second router, a primary switching label that the second router normally uses for receiving multicast data traffic via the primary network path; and
   receiving, at the second router, multicast data traffic in accordance with the new multicast switching label used for the secondary network path.

7. A method as in claim 1 further comprising:
   configuring the backup label switched path between the first router and the second router;
   in response to detecting the failure in the network, initiating transmission of the multicast data traffic over the backup label switched path between the first router and the second router in lieu of transmitting the multicast data traffic over the primary network path.

8. A method as in claim 7 wherein the configuring the second router to receive multicast data traffic addressed to the new multicast switching label comprises:
   removing, from the second router, a backup path switching label that the second router normally uses for receiving multicast data traffic via the backup label switched path;
   receiving, at the second router, multicast data traffic in accordance with the new multicast switching label used for the secondary network path.

9. A tangible computer readable medium having computer readable code thereon for providing a method for minimizing duplicate traffic during point to multipoint (P2MP) tree switching in a network including a P2MP tree with a source node, the tangible computer readable medium comprising:
   instructions operable on a processor to receive multicast data traffic transmitted from a first router over a primary network path to a second router, wherein the primary network path supports multicast label switching of multicast data traffic;

instructions operable on the processor to, in response to a detection of a failure in the network, receive the multicast data traffic over a backup label switched path on a secondary network path between the first router and the second router in lieu of receiving the multicast data traffic over the primary network path and minimize duplicate traffic via an initiation of a multicast rerouting procedure, wherein the instructions to minimize duplicate traffic via the initiation of the multicast rerouting procedure comprise:

instructions operable on the processor to transmit a new multicast switching label via the secondary network path to an upstream router, the secondary network path including the upstream router between the first router and the second router; and instructions operable on the processor to configure the second router, upon receipt of an acknowledgement notification from the upstream router via the secondary network path indicating that the upstream router is a merge point in the P2MP tree, to receive multicast data traffic addressed to the new multicast switching label from the upstream router prior to the PSMP tree being in a convergent state after the failure instead of to receive multicast data traffic from the backup label switched path.

10. A tangible computer readable medium as in claim 9 wherein the instructions operable on the processor to minimize duplicate traffic via the initiation of the multicast rerouting procedure by transmitting the new multicast switching label via the secondary network path to the upstream router comprise:

instructions operable on the processor to execute a reverse path forwarding procedure.

11. A tangible computer readable medium as in claim 9 wherein the instructions operable on the processor to minimize duplicate traffic via the initiation of the multicast rerouting procedure further comprise:

instructions operable on the processor to add, in response to a determination the upstream router receives multicast data traffic, the new multicast switching label to a routing table at the upstream router; and instructions operable on the processor to transmit the acknowledgement notification to the second router via the secondary network path.

12. A tangible computer readable medium as in claim 9 wherein the instructions operable on the processor to minimize duplicate traffic via the initiation of the multicast rerouting procedure further comprise:

instructions operable on the processor to transmit, in response to a determination an upstream node on the secondary network path does not receive multicast data traffic, a respective switching label to a next upstream router via the secondary network path;

instructions operable on the processor to propagate the acknowledgement notification from the upstream router, which is in receipt of multicast data traffic, to the second router via the secondary network path.

13. A tangible computer readable medium as in claim 9 wherein the instructions operable on the processor to minimize duplicate traffic via the initiation of the multicast rerouting procedure further comprise:

instructions operable on the processor to transmit a respective switching label to a next upstream router via the secondary network path in response to a determination the upstream router is not the source node of the P2MP tree; and instructions operable on the processor to propagate the acknowledgement notification from the source node of the P2MP tree to the second router via the secondary network path.

14. A tangible computer readable medium as in claim 9 wherein the instructions operable on the processor to configure the second router to receive multicast data traffic addressed to the new multicast switching label comprises:

instructions operable on the processor to remove, from the second router, a primary switching label that the second router uses to receive the multicast data traffic via the primary network path;

instructions operable on the processor to receive, at the second router, multicast data traffic in accordance with the new multicast switching label used for the secondary network path.

15. A tangible computer readable medium as in claim 9 further comprising:

instructions operable on the processor to configure the backup label switched path on the secondary network path between the first router and the second router;

instructions operable on the processor to initiate, in response to the detection of the failure in the network, transmission of the multicast data traffic over the backup label switched path between the first router and the second router in lieu of transmission of the multicast data traffic over the primary network path.

16. A tangible computer readable medium as in claim 15 wherein the instructions operable on the processor to configure the second router to receive multicast data traffic from the secondary network path comprise:

instructions operable on the processor to remove, from the second router, a backup label switched path switching label that the second router normally uses for receiving multicast data traffic via the backup label switched path;

instructions operable on the processor to receive, at the second router, multicast data traffic in accordance with the new multicast switching label used for the secondary network path.

17. A network device comprising:

a memory;

a processor;

a communications interface;

an interconnection mechanism coupling the memory, the processor and the communications interface; and wherein the memory is encoded with a network manager application that when performed on the processor duplicate traffic during point to multipoint (P2MP) tree switching in a network including a P2MP tree with a source node by performing the operations of:

receiving multicast data traffic transmitted from a first router over a primary network path to a second router, wherein the network path supports multicast label switching of multicast data traffic;

in response to detecting a failure in the network, receiving the multicast data traffic over a backup label switched path on a secondary network path between the first router and the second router in lieu of receiving the multicast data traffic over the primary network path and minimizing duplicate traffic by initiating a multicast rerouting procedure, the multicast rerouting procedure comprising:

transmitting a new multicast switching label via the secondary network path to an upstream router, the secondary network path including the upstream router between the first router and the second router; and upon receiving an acknowledgement notification from the upstream router indicating that the upstream router is a merge point in the P2MP tree, configuring the second router to receive multicast data traffic addressed to the new multicast switching label from the upstream router over the secondary network path prior to the PSMP tree being in a convergent state after the failure and in lieu of receiving multicast data traffic over the backup label switched path.

18. A network device as in claim 17 wherein initiating the multicast rerouting procedure by transmitting the new multicast switching label via the secondary network path to the upstream router comprises:
   initiating the multicast rerouting procedure by implementing a reverse path forwarding procedure.

19. A network device as in claim 17 wherein initiating the multicast rerouting procedure by transmitting the new multicast switching label via the secondary network path to the upstream router comprises:
   adding the new multicast switching label to a routing table at the upstream router in response to determining the upstream router receives multicast data traffic; and
   transmitting the acknowledgement notification to the second router via the secondary network path.

20. A network device as in claim 17 wherein initiating the multicast rerouting procedure by transmitting the new multicast switching label via the secondary network path to the upstream router comprises:
   transmitting at an upstream node a respective switching label to a next upstream router via the secondary network path in response to determining the upstream node is not receiving multicast data traffic, wherein the upstream node and the next upstream router are on the secondary network path between the upstream router and the second router; and
   propagating the acknowledgement notification from the upstream router receiving multicast data traffic to the second router via the secondary network path.

21. A network device as in claim 17 wherein initiating the multicast rerouting procedure by transmitting the new multicast switching label via the secondary network path to the upstream router comprises:
   transmitting a respective switching label to a next upstream router via the secondary network path in response to determining an upstream node is not the source node of the P2MP tree;
   propagating the acknowledgement notification from the source node of the P2MP tree to the second router via the secondary network path.

22. A network device as in claim 17 wherein configuring the second router to receive multicast data traffic from the secondary network path comprises:
   removing, from the second router, a primary switching label that the second router normally uses for receiving multicast data traffic via the primary network path; and
   receiving, at the second router, multicast data traffic in accordance with the new multicast switching label used for the secondary network path.

23. A network device as in claim 17 further comprising:
   configuring the backup label switched path between the first router and the second router, the backup label switched path to tunnel the multicast data traffic to the second router;
   in response to detecting the failure in the network, initiating transmission of the multicast data traffic over the backup label switched path between the first router and the second router in lieu of transmitting the multicast data traffic over the primary network path.

24. A network device as in claim 23 wherein the configuring the second router to receive multicast data traffic addressed to the new multicast switching label and transmitted from the upstream router over the secondary network path comprises:
   removing, from the second router, a backup label switched path switching label that the second router uses for receiving multicast data traffic via the backup label switched path;
   receiving, at the second router, multicast data traffic in accordance with the new multicast switching label used for the secondary network path.

* * * * *

UNITED STATES PATENT AND TRADEMARK OFFICE
CERTIFICATE OF CORRECTION

PATENT NO. : 7,899,049 B2
APPLICATION NO. : 11/497952
DATED : March 1, 2011
INVENTOR(S) : Alex E. Raj et al.

It is certified that error appears in the above-identified patent and that said Letters Patent is hereby corrected as shown below:

Column 13, line 22 delete "PSMP" and insert --P2MP--.

Column 15, line 6 delete "PSMP" and insert --P2MP--.

Signed and Sealed this
Tenth Day of May, 2011

David J. Kappos
*Director of the United States Patent and Trademark Office*